United States Patent
Yano et al.

(10) Patent No.: US 12,119,499 B2
(45) Date of Patent: Oct. 15, 2024

(54) CHROMIUM-CONTAINING STEEL SHEET FOR CURRENT COLLECTOR OF NONAQUEOUS ELECTROLYTE SECONDARY BATTERY AND METHOD FOR MANUFACTURING THE SAME

(71) Applicant: JFE Steel Corporation, Tokyo (JP)

(72) Inventors: Takayoshi Yano, Tokyo (JP); Shin Ishikawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 464 days.

(21) Appl. No.: 17/623,680

(22) PCT Filed: Jun. 2, 2020

(86) PCT No.: PCT/JP2020/021681
§ 371 (c)(1),
(2) Date: Dec. 29, 2021

(87) PCT Pub. No.: WO2021/005919
PCT Pub. Date: Jan. 14, 2021

(65) Prior Publication Data
US 2022/0246943 A1    Aug. 4, 2022

(30) Foreign Application Priority Data
Jul. 9, 2019 (JP) ................................. 2019-127490

(51) Int. Cl.
*H01M 4/66* (2006.01)
*C23F 1/26* (2006.01)

(52) U.S. Cl.
CPC .............. *H01M 4/669* (2013.01); *C23F 1/26* (2013.01)

(58) Field of Classification Search
None
See application file for complete search history.

(56) References Cited

U.S. PATENT DOCUMENTS

| | | |
|---|---|---|
| 5,162,178 A | 11/1992 | Ohsawa et al. |
| 6,558,848 B1 | 5/2003 | Kobayashi et al. |
| (Continued) | | |

FOREIGN PATENT DOCUMENTS

| | | |
|---|---|---|
| EP | 3916136 A1 | 12/2021 |
| JP | 08321310 A | 12/1996 |
| (Continued) | | |

OTHER PUBLICATIONS

International Search Report and Written Opinion for International Application No. PCT/JP2020/021681, dated Aug. 18, 2020, 6 pages.

(Continued)

*Primary Examiner* — Wyatt P McConnell
(74) *Attorney, Agent, or Firm* — Buchanan Ingersoll & Rooney PC

(57) ABSTRACT

The present invention provides a chromium-containing steel sheet for a current collector of a nonaqueous electrolyte secondary battery which has excellent corrosion resistance in a battery environment and, when used as a current collector of a nonaqueous electrolyte secondary battery, which enables the nonaqueous electrolyte secondary battery to have excellent cycle characteristics.

A chromium-containing steel sheet for a current collector of a nonaqueous electrolyte secondary battery has a chemical composition containing 10% by mass or more of Cr. The chromium-containing steel sheet has an irregular structure including recesses and protrusions at a surface thereof. The average height of the protrusions is 20 nm or more and 100 nm or less, and the average spacing between the protrusions is 20 nm or more and 300 nm or less.

2 Claims, 3 Drawing Sheets

(56) References Cited

U.S. PATENT DOCUMENTS

| | | | |
|---|---|---|---|
| 9,780,359 B2 | 10/2017 | Kim et al. | |
| 2003/0224236 A1* | 12/2003 | Morita | H01M 8/021 429/508 |
| 2020/0248332 A1 | 8/2020 | Yano et al. | |

FOREIGN PATENT DOCUMENTS

| | | | |
|---|---|---|---|
| JP | 2000012088 A | 1/2000 |
| JP | 2007242424 A | 9/2007 |
| JP | 2009167486 A | 7/2009 |
| JP | 2010033782 A | 2/2010 |
| JP | 2010262843 A | 11/2010 |
| JP | 2011258407 A | 12/2011 |
| JP | 2013206741 A | 10/2013 |
| JP | 2014212028 A | 11/2014 |
| JP | 2014229556 A | 12/2014 |
| JP | 2015513182 A | 4/2015 |
| JP | 2015210917 A | 11/2015 |
| KR | 10-2013-0116828 A | 10/2013 |
| WO | 2019082591 A1 | 5/2019 |

OTHER PUBLICATIONS

Office Action with Search Report issued Jun. 14, 2024, by the National Intellectual Property Administration, P. R. China in corresponding Chinese Patent Application No. 202080049415.1 (12 pages).

Extended European Search Report for European Application No. 20836825.8, dated May 3, 2022, 8 pages.

Japanese Office Action for Japanese Application No. 2020-548842, dated Sep. 29, 2021, with Concise Statement of Relevance of Office Action, 5 pages.

Office Action (Request for the Submission of an Opinion) issued Aug. 1, 2024, by the Korean Intellectual Property Office in corresponding Korean Patent Application No. 10-2022-7000339 and an English translation of the Office Action. (9 pages).

\* cited by examiner

CHROMIUM-CONTAINING STEEL SHEET FOR CURRENT COLLECTOR OF NONAQUEOUS ELECTROLYTE SECONDARY BATTERY AND METHOD FOR MANUFACTURING THE SAME

CROSS REFERENCE TO RELATED APPLICATIONS

This is the U.S. National Phase application of PCT/JP2020/021681, filed Jun. 2, 2020 which claims priority to Japanese Patent Application No. 2019-127490, filed Jul. 9, 2019, the disclosures of these applications being incorporated herein by reference in their entireties for all purposes.

FIELD OF THE INVENTION

The present invention relates to a chromium-containing steel sheet for a current collector of a nonaqueous electrolyte secondary battery and a method for manufacturing the same, and in particular relates to a chromium-containing steel sheet for a current collector of a nonaqueous electrolyte lithium ion secondary battery and a method for manufacturing the same.

BACKGROUND OF THE INVENTION

In recent years, from the viewpoint of global environmental conservation, production of electric vehicles (EV) equipped with nonaqueous electrolyte lithium ion secondary batteries (LIB) has been increasing. A nonaqueous electrolyte secondary battery includes, as main constituent elements, current collectors (for positive electrode and negative electrode), active materials (for positive electrode and negative electrode), a separator, and a nonaqueous electrolyte. The nonaqueous electrolyte includes an organic solvent and an electrolyte, and in an LIB, a material obtained by dissolving a Li salt in an organic solvent is used as the nonaqueous electrolyte.

As current collectors of an LIB, an Al foil is mainly used for the positive electrode, and a Cu foil is mainly used for the negative electrode. For the purpose of improving durability, application of stainless steel foils having more high strength and high corrosion resistance has also been under study.

For example, Patent Literature 1 discloses a bipolar battery in which stainless steel containing 16 to 26% by mass of Cr and 0.5 to 7% by mass of Mo is used for a current collector foil, and thus even when used at a high potential (about 4.2 V) for a long period of time, the current collector foil is not corroded and dissolved out, and battery characteristics are not likely to deteriorate.

Furthermore, Patent Literature 2 discloses a ferrite-based stainless steel for a battery component member which contains Cr: 16.0 to 32.0%, C: 0.015% or less, Si: 0.5% or less, and Mn: 2.0% or less, and has, as a surface layer, a passive film with a composition ratio Cr/(Cr+Fe)>0.2 and a thickness of 4 nm or less, and thus even when a high voltage is applied to the battery, corrosion resistance is maintained, and sparking is not likely to occur.

PATENT LITERATURE

PTL 1: Japanese Unexamined Patent Application Publication No. 2007-242424

PTL 2: Japanese Unexamined Patent Application Publication No. 2009-167486

SUMMARY OF THE INVENTION

However, as a result of evaluation of battery performance in which the stainless steels described in Patent Literatures 1 and 2 are each actually used for a negative electrode current collector of a nonaqueous electrolyte lithium ion secondary battery, it has been found that in some cases, the battery capacity is likely to decrease when charging and discharging are repeatedly performed, compared with the case where a Cu foil is used for the current collector.

Although the reason for deterioration in battery capacity characteristics (hereinafter, referred to as "cycle characteristics") when charging and discharging are repeatedly performed is not clear, the present inventors' ideas are as follows. A Cu foil which is mainly used for a negative electrode current collector of a nonaqueous electrolyte lithium ion secondary battery has a high electrical conductivity at the surface thereof. On the other hand, electrical conductivity at the surface of a stainless steel sheet is lower compared with the surface of the Cu foil because a passive film is formed on the surface thereof. Therefore, it is considered that in the stainless steel sheet, compared with the Cu foil, the electrical resistance at an interface between a current collector and an electrode layer formed thereon (hereinafter, referred to as the "interface resistance") is likely to increase, resulting in deterioration in cycle characteristics. Furthermore, it is considered that, when charging and discharging are repeated, a film having a high electrical resistance is formed on the surface of a stainless steel sheet to increase the interface resistance, resulting in deterioration in cycle characteristics.

Moreover, a steel sheet for a current collector of a nonaqueous electrolyte secondary battery is required to have corrosion resistance in a battery environment. That is, it is required to prevent deterioration in battery characteristics due to occurrence of corrosion in the steel sheet in a nonaqueous electrolyte secondary battery environment.

In a steel sheet for a current collector of a nonaqueous electrolyte secondary battery, when the corrosion resistance in the battery environment is low, corrosion products may be formed on the surface of the current collector or corrosion pits may open. The present inventors consider that since this hinders electron transfer between the surface of the current collector and the active material, battery characteristics are deteriorated.

The environment to which a current collector of a nonaqueous electrolyte lithium ion secondary battery is exposed is a special environment (hereinafter, referred to as the "battery environment") that is in a nonaqueous electrolyte in which a Li salt, such as $LiPF_6$, $LiBF_4$, or $LiClO_4$, is dissolved in an organic solvent, such as dimethyl carbonate, diethyl carbonate, ethylene carbonate, or ethyl methyl carbonate, and to which a potential in the range of 0.0 to 5.0 V (vs. $Li/Li^+$) is applied.

The present inventors have come to consider that, in the battery environment, by setting the Cr content in the chromium-containing steel sheet to be greater than or equal to a certain value, the Cr oxide film formed on the surface of the steel sheet is stabilized, and corrosion resistance in the battery environment can be secured.

Aspects of the present invention have been made under the circumstances described above, and it is an object according to aspects of the present invention to provide a chromium-containing steel sheet for a current collector of a nonaqueous electrolyte secondary battery which has excellent corrosion resistance in a battery environment and, when used as a current collector of a nonaqueous electrolyte secondary battery, which enables the nonaqueous electrolyte secondary battery to have excellent cycle characteristics.

Furthermore, it is an object according to aspects of the present invention to provide an advantageous method for manufacturing the chromium-containing steel sheet for a current collector of a nonaqueous electrolyte secondary battery.

The present inventors have conducted thorough studies to solve the problem described above.

As described above, the present inventors have come to consider that deterioration in cycle characteristics is due to an increase in the interface resistance between a current collector and an electrode layer formed thereon.

Accordingly, the present inventors have considered that it may be possible to improve the cycle characteristics if fine irregularities are provided on the surface of a chromium-containing steel sheet in order to suppress an increase in the interface resistance.

Specifically, it has been concluded that, by providing fine irregularities on the surface of a chromium-containing steel sheet, fine protrusions on the surface of the steel sheet pierce an electrode layer, and furthermore, the contact area between the surface of the steel sheet and the electrode layer increases, thereby decreasing the interface resistance so that the cycle characteristics is improved.

On the basis of this idea, as a result of further studies by the present inventors, it has been found that, by forming a predetermined irregular structure on the surface of a chromium-containing steel sheet, the cycle characteristics can be improved even when a chromium-containing steel sheet is used for a negative electrode current collector of a nonaqueous electrolyte lithium ion secondary battery.

On the basis of the finding described above, further studies have been conducted, and thus aspects of the present invention have been completed, and are as follows.

[1] A chromium-containing steel sheet for a current collector of a nonaqueous electrolyte secondary battery which comprises a chemical composition containing 10% by mass or more of Cr. The chromium-containing steel sheet has an irregular structure including recesses and protrusions at a surface thereof. An average height of the protrusions is 20 nm or more and 100 nm or less, and an average spacing between the protrusions is 20 nm or more and 300 nm or less.

[2] A method for manufacturing the chromium-containing steel sheet for a current collector of a nonaqueous electrolyte secondary battery according to [1] which includes:
preparing a raw material chromium-containing steel sheet;
then, removing an oxide film on a surface of the raw material chromium-containing steel sheet;
then, subjecting the raw material chromium-containing steel sheet from which the oxide film has been removed to an etching treatment in an active region of the raw material chromium-containing steel sheet; and
then, subjecting the raw material chromium-containing steel sheet which has been subjected to the etching treatment to an immersion treatment in an oxidizing solution, or to an electrolysis treatment in a passive region of the raw material chromium-containing steel sheet.

According to aspects of the present invention, it is possible to obtain a chromium-containing steel sheet which has excellent corrosion resistance in a battery environment and, when used as a current collector of a nonaqueous electrolyte secondary battery, which enables the nonaqueous electrolyte secondary battery to have excellent cycle characteristics.

By using the chromium-containing steel sheet according to aspects of the present invention for a current collector of a nonaqueous electrolyte secondary battery, cycle characteristics of the nonaqueous electrolyte secondary battery can be improved. According to aspects of the present invention, a chromium-containing steel sheet for a current collector of a nonaqueous electrolyte secondary battery can be obtained at low cost and with high productivity. The chromium-containing steel sheet according to aspects of the present invention is particularly suitable for a current collector of a nonaqueous electrolyte lithium ion secondary battery.

DETAILED DESCRIPTION OF EMBODIMENTS OF THE INVENTION (1) Chromium-Containing Steel Sheet for Current Collector of Nonaqueous Electrolyte Secondary Battery In a chromium-containing steel sheet for a current collector of a nonaqueous electrolyte secondary battery according to an embodiment of the present invention, it is important to provide a predetermined irregular structure at a surface of the steel sheet. Because of the irregular structure, fine protrusions on the surface of the steel sheet pierce an electrode layer. Furthermore, since the contact area between the surface of the steel sheet and the electrode layer increases, a decreasing effect of interface resistance between the current collector and the electrode layer can be expected. Because of the decreasing effect of interface resistance, it is possible to obtain an effect of improving cycle characteristics of the nonaqueous electrolyte secondary battery. Hereinafter, the chromium-containing steel sheet for a current collector of a nonaqueous electrolyte secondary battery according to aspects of the present invention may also be simply referred to as the chromium-containing steel sheet.

[Average Height of Protrusions in the Irregular Structure at the Surface of the Chromium-Containing Steel Sheet: 20 nm or More and 100 nm or Less]

As described above, from the viewpoint of obtaining excellent cycle characteristics, it is necessary to set the average height of protrusions in the irregular structure at the surface of the chromium-containing steel sheet to be 20 nm or more and 100 nm or less. When the average height of protrusions is less than 20 nm, the height difference between recesses and protrusions becomes too small, and fine protrusions at the surface of the chromium-containing steel sheet do not sufficiently pierce the electrode layer, or the contact area with the electrode layer cannot be sufficiently increased, resulting in no decrease in interface resistance. As a result, cycle characteristics are deteriorated. On the other hand, when the average height of protrusions is more than 100 nm, during etching treatment, the dissolution amount and thus the etching time increase, which is disadvantageous in terms of the productivity. Therefore, the average height of protrusions is set to be 20 nm or more and 100 nm or less. The average height of protrusions is preferably 25 nm or more. Furthermore, the average height of protrusions is preferably 80 nm or less.

Figure 2:
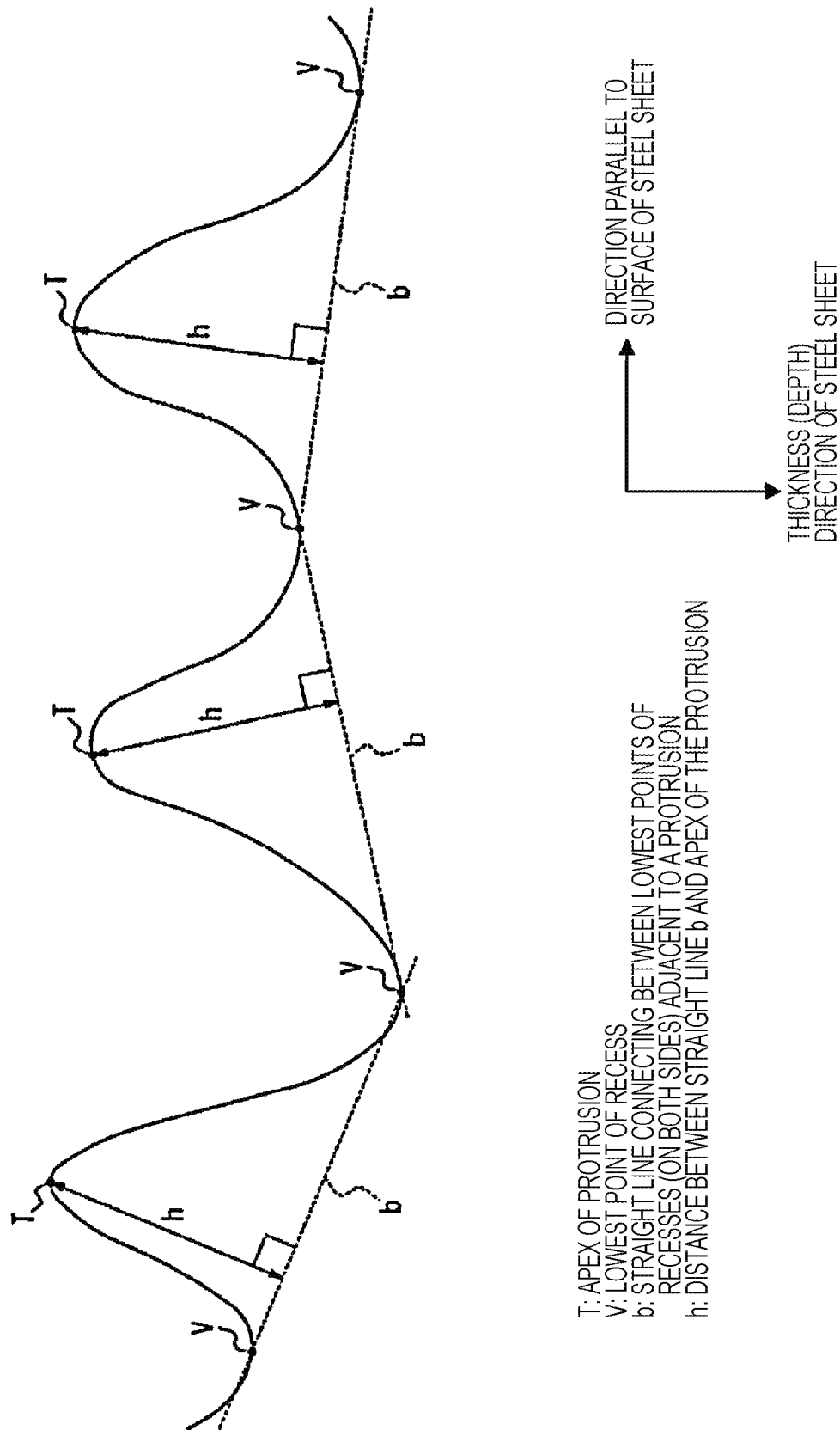
FIG. 2 is a schematic diagram showing the procedure for measuring the height of protrusions.

The average height of protrusions is determined as follows. That is, a thin film sample for cross-section observation is produced from a chromium-containing steel sheet, using a focused ion beam machine (FIB, Versa 3D Dual-Beam manufactured by FEI Corporation). Then, this sample is observed with a spherical aberration corrected scanning transmission electron microscope (Cs-corrected STEM, JEM-ARM200F manufactured by JEOL Ltd.) at 50,000 times for random five fields of view to obtain TEM images. In each of the obtained TEM images, the surface of the steel sheet is checked. As shown in FIG. 2, lowest points of recesses (on both sides) adjacent to a protrusion (lowest points in the thickness (depth) direction of the steel sheet) are connected by a straight line, and the distance between the straight line and the apex of the protrusion (the apex in the thickness (depth) direction of the steel sheet) is obtained. The obtained distance is defined as the height of the protrusion. In this way, the height of each protrusion on the surface of the steel sheet observed in each of the TEM images is obtained. The (arithmetic) average value of the height of the individual protrusions obtained is defined as an average height of protrusions. Those which have a height of less than 10 nm are not regarded as protrusions and are excluded from the calculation of the average value described above.

[Average Spacing Between Protrusions in the Irregular Structure at the Surface of the Chromium-Containing Steel Sheet: 20 nm or More and 300 nm or Less]

In order to obtain excellent cycle characteristics, it is necessary to set the average spacing between protrusions at the surface of the chromium-containing steel sheet (hereinafter, may also be simply referred to as the surface of the steel sheet) to be 20 nm or more and 300 nm or less. When the average spacing between protrusions is less than 20 nm, irregularities are too fine, and fine protrusions at the surface of the steel sheet do not effectively pierce the electrode layer, or the contact area between the surface of the steel sheet and the electrode layer cannot be sufficiently increased, resulting in no decrease in interface resistance. As a result, cycle characteristics are deteriorated. On the other hand, when the average spacing between protrusions is more than 300 nm, the number of irregularities becomes too small, and the contact area between the surface of the steel sheet and the electrode layer cannot be sufficiently increased, resulting in no decrease in interface resistance. As a result, cycle characteristics are deteriorated. Therefore, the average spacing between protrusions is set to be 20 nm or more and 300 nm or less. The average spacing between protrusions is preferably 100 nm or more. Furthermore, the average spacing between protrusions is preferably 250 nm or less.

Figure 1:
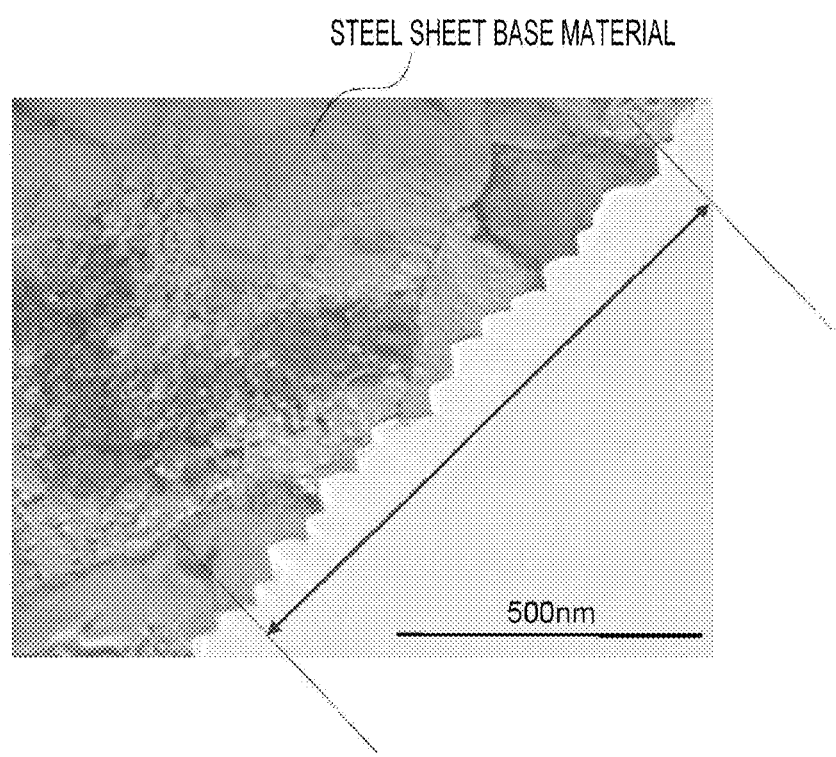
FIG. 1 shows an example of a TEM image obtained by observing a cross section of a chromium-containing steel sheet in an Example (Sample No. 4) of the present invention.

The average spacing between protrusions is determined as follows. That is, in each of the TEM images obtained as described above, as shown in FIG. 1, a line segment (length: 1 μm) is arbitrarily drawn in a direction parallel to the surface of the steel sheet (a direction perpendicular to the thickness (depth) direction of the steel sheet), and the number of protrusions in the projected region in the thickness (depth) direction of the steel sheet of the line segment (the number of apexes of the protrusions described above) is measured. The length of the line segment (1 μm) is divided by the number of protrusions measured, and the resulting value is defined as the spacing between protrusions. Then, the (arithmetic) average value of the spacing between protrusions obtained in each of the TEM images is obtained and defined as the average spacing between protrusions. Those which have a height of less than 10 nm are not regarded as protrusions and are excluded from the number of protrusions described above.

[Chemical Composition of Chromium-Containing Steel Sheet]

The chromium-containing steel sheet according to aspects of the present invention has a chemical composition containing 10% by mass or more of Cr. Cr is effective in improving corrosion resistance in a battery environment. By setting the Cr content to be 10% by mass or more, even when used for a current collector of a nonaqueous electrolyte secondary battery, in particular, a current collector of a nonaqueous electrolyte lithium ion secondary battery, corrosion resistance in the battery environment can be secured. In the chromium-containing steel sheet according to aspects of the present invention, although constituents other than Cr are not particularly limited, a preferable chemical composition is described below.

[Preferable Chemical Composition of Chromium-Containing Steel Sheet]

A chromium-containing steel sheet according to aspects of the present invention preferably has a chemical composition containing, in % by mass, C: 0.001 to 0.050%, Si: 0.01 to 2.00%, Mn: 0.01 to 1.00%, P: 0.050% or less, S: 0.010% or less, Cr: 10.00 to 32.00%, Ni: 0.01 to 4.00%, Al: 0.001 to 0.150%, and N: 0.050% or less, with the balance being Fe and incidental impurities. The chemical composition, as necessary, may further contain, in % by mass, one or two or more selected from the group consisting of Mo: 0.01 to 2.50%, Cu: 0.01 to 0.80%, Ti: 0.01 to 0.45%, Nb: 0.01 to 0.60%, and V: 0.01 to 0.30%.

The reasons for the above will be described below. Note that "%" shown for the chemical composition means "% by mass" unless otherwise stated.

C: 0.001 to 0.050%

C combines with Cr in steel and is precipitated as Cr carbide at grain boundaries to form a Cr-depleted zone, resulting in deterioration in corrosion resistance. Therefore, from the viewpoint of corrosion resistance, a lower C content is more preferable, and the C content is preferably 0.050% or less. The C content is more preferably 0.030% or less, and still more preferably 0.020% or less. Although the lower limit is not particularly limited, the lower limit of the C content is preferably set to be 0.001%.

Si: 0.01 to 2.00%

Si is an effective element for deoxidization and is added in the steelmaking stage. The effect thereof is obtained with a content of 0.01% or more. Therefore, the Si content is preferably 0.01% or more. However, when Si is excessively contained, steel becomes hard, and manufacturability is deteriorated. Therefore, the Si content is preferably 2.00% or less. The Si content is more preferably 1.00% or less, and still more preferably 0.60% or less.

Mn: 0.01 to 1.00%

Mn is an effective element for deoxidization and is added in the steelmaking stage. The effect thereof is obtained with a content of 0.01% or more. Therefore, the Mn content is preferably 0.01% or more. However, when the Mn content exceeds 1.00%, corrosion resistance is likely to be deteriorated. Therefore, the Mn content is preferably 1.00% or less. The Mn content is more preferably 0.60% or less.

P: 0.050% or Less

Since P deteriorates ductility, the content thereof is desirably as low as possible. However, when the P content is 0.050% or less, significant deterioration in ductility does not occur. Therefore, the P content is preferably 0.050% or less. The P content is more preferably 0.040% or less. Although the lower limit is not particularly limited, since excessive dephosphorization results in an increase in manufacturing cost, the lower limit of the P content is preferably set to be about 0.010%. For example, the P content is preferably 0.005% or more.

S: 0.010% or Less

S is an element that combines with Mn to form MnS, which becomes a starting point of corrosion, thereby deteriorating corrosion resistance. However, when the S content is 0.010% or less, significant deterioration in corrosion resistance does not occur. Therefore, the S content is preferably 0.010% or less. Although the lower limit is not particularly limited, since excessive desulfurization results in an increase in manufacturing cost, the lower limit of the S content is preferably set to be about 0.001%. For example, the S content is preferably 0.0005% or more.

Cr: 10.00 to 32.00%

As described above, by setting the Cr content to be 10% or more, even when used for a current collector of a nonaqueous electrolyte secondary battery, in particular, a current collector of a nonaqueous electrolyte lithium ion secondary battery, corrosion resistance in the battery environment can be secured. Therefore, the Cr content is 10% or more. The Cr content is preferably 10.00% or more, and more preferably 16.00% or more. On the other hand, when the Cr content exceeds 32.00%, precipitation of the σ phase may deteriorate toughness in some cases. Therefore, the Cr content is preferably 32.00% or less. The Cr content is more preferably 25.00% or less.

Ni: 0.01 to 4.00%

Ni is an element that effectively contributes to improvement in corrosion resistance. The effect thereof is obtained with a Ni content of 0.01% or more. However, when the Ni content exceeds 4.00%, steel becomes hard, and manufacturability is deteriorated. Moreover, since Ni is an expensive element, an increase in cost is caused. Therefore, the Ni content is preferably in the range of 0.01 to 4.00%. The Ni content is more preferably 0.10% or more. Furthermore, the Ni content is more preferably 2.00% or less, and still more preferably 0.50% or less.

Al: 0.001 to 0.150%

Al is an element that is used for deoxidization. The effect thereof is obtained with a content of 0.001% or more. Therefore, the Al content is preferably 0.001% or more. However, when the Al content exceeds 0.150%, ductility is deteriorated. Therefore, the Al content is preferably 0.150% or less. The Al content is more preferably 0.100% or less.

N: 0.050% or Less

When the N content exceeds 0.050%, ductility deteriorates. Therefore, the N content is preferably 0.050% or less. The N content is more preferably 0.030% or less. Although the lower limit is not particularly limited, since excessive denitrification results in an increase in cost, the lower limit of the N content is preferably set to be about 0.002%.

The elements described above are preferably used as basic constituents. In accordance with aspects of the present invention, as necessary, the elements described below may be appropriately contained.

Mo: 0.01 to 2.50%

Mo is an element that is effective in improving corrosion resistance. The effect thereof is obtained preferably with a content of 0.01% or more. However, when the Mo content exceeds 2.50%, embrittlement of steel is caused. Therefore, when Mo is contained, the Mo content is preferably 0.01 to 2.50%.

Cu: 0.01 to 0.80%

Cu is an element that is effective in improving corrosion resistance. The effect thereof is obtained preferably with a content of 0.01% or more. However, when the Cu content exceeds 0.80%, hot workability deteriorates, resulting in a decrease in the productivity. Therefore, when Cu is contained, the Cu content is preferably 0.01 to 0.80%.

Ti: 0.01 to 0.45%

Ti is an element that combines with C and N, which prevents excessive precipitation of Cr carbonitrides in steel, thereby suppressing deterioration in corrosion resistance (sensitization). These effects are obtained with a Ti content of 0.01% or more. On the other hand, when the Ti content exceeds 0.45%, workability deteriorates. Therefore, when Ti is contained, the Ti content is preferably in the range of 0.01 to 0.45%. The Ti content is more preferably 0.10% or more. Furthermore, the Ti content is more preferably 0.40% or less.

Nb: 0.01 to 0.60%

Nb is an element that combines with C and N, thereby suppressing sensitization as in the case of Ti. These effects are obtained with the Nb content of 0.01% or more. On the other hand, when the Nb content exceeds 0.60%, workability deteriorates. Therefore, when Nb is contained, the Nb content is preferably in the range of 0.01 to 0.60%. The Nb content is more preferably 0.10% or more. Furthermore, the Nb content is more preferably 0.40% or less.

V: 0.01 to 0.30%

V is an element that combines with C and N contained in steel, thereby suppressing deterioration in corrosion resistance (sensitization) as in the case of Nb and Ti. This effect is obtained with a V content of 0.01% or more. On the other hand, when the V content exceeds 0.30%, workability deteriorates. Therefore, when V is contained, the V content is preferably in the range of 0.01 to 0.30%. The V content is more preferably 0.20% or less, further more preferably 0.15% or less, and still more preferably 0.10% or less.

Note that the constituents other than the above are Fe and incidental impurities.

The thickness of the chromium-containing steel sheet is preferably 50 μm or less. When the thickness is 50 μm or less, it becomes easy to suppress an increase in weight of the battery. The thickness is more preferably 30 μm or less. Furthermore, the thickness of the chromium-containing steel sheet is preferably 5 μm or more. When the thickness is 5 μm or more, a significant decrease in production efficiency of the chromium-containing steel sheet can be suppressed, and an increase in manufacturing cost can also be suppressed.

(2) Method for Manufacturing Chromium-Containing Steel Sheet for Current Collector of Nonaqueous Electrolyte Secondary Battery Next, a method for manufacturing a chromium-containing steel sheet for a current collector of a nonaqueous electrolyte secondary battery according to an embodiment of the present invention will be described.

[Production Process of Raw Material Chromium-Containing Steel Sheet]

A steel slab having the chemical composition as described above is hot rolled to obtain a hot rolled steel sheet, the hot rolled steel sheet is subjected to hot rolled steel sheet annealing and pickling as necessary, and then the hot rolled steel sheet is subjected to cold rolling to obtain a cold rolled steel sheet with a desired thickness. For example, in the case where a chromium-containing steel sheet with a final thickness of 10 μm is produced, in the cold rolling step, cold rolled steel sheet annealing is performed as necessary, and cold rolling is further performed to reach the final thickness.

Note that the conditions for hot rolling, cold rolling, hot rolled steel sheet annealing, cold rolled steel sheet annealing, and the like are not particularly limited, and usual methods may be used. Furthermore, pickling may be performed after cold rolled steel sheet annealing. Furthermore, cold rolled steel sheet annealing may be performed by bright annealing. The chromium-containing steel sheet produced as described above is prepared as a raw material chromium-containing steel sheet.

[Oxide Film Removal Treatment Step]

In an oxide film removal treatment step, an oxide film formed in advance on a surface of the raw material chromium-containing steel sheet (hereinafter, may be simply referred to as the "oxide film") is removed. By performing such oxide film removal treatment before performing an etching treatment which will be described later, the effect of improving cycle characteristics by the etching treatment in an active region can be stably obtained.

The examples of the oxide film formed in advance include a passive film formed in the air.

Furthermore, the oxide film may be removed by anodic electrolysis treatment, cathodic electrolysis treatment, or a combination of anodic electrolysis treatment and cathodic electrolysis treatment. In particular, cathodic electrolysis treatment is preferable. In cathodic electrolysis treatment, dissolution amount of the steel sheet base material is reduced compared with anodic electrolysis treatment, which is particularly advantageous.

Regarding conditions for the cathodic electrolysis treatment, the treatment may be performed with a current density that can remove the oxide film on the surface of the steel sheet. Specifically, electrolysis conditions are preferably adjusted each time depending on the steel type of the steel sheet, the thickness of the oxide film formed in advance, the structure of the electrolysis device, and the like.

For example, in the case of potential control, the cathodic electrolysis treatment may be performed in a 30 g/L sulfuric acid aqueous solution under the conditions of a potential of $-0.7$ V (vs. Ag/AgCl) and a treatment time of 1 minute or more. Note that V (vs. Ag/AgCl) is a potential with respect to a silver-silver chloride electrode used as a reference electrode, and hereinafter will be described as (vs. Ag/AgCl).

Furthermore, in the case of current control, although it depends on the steel type and the thickness of the oxide film, it is preferable to adjust the current density in the range of $-0.1$ to $-100$ mA/cm$^2$ and the treatment time in the range of 1 to 600 seconds. In particular, although the treatment time differs depending on the current density, for example, when the current density is $-0.5$ mA/cm$^2$, by setting the treatment time to 60 seconds or more, the oxide film on the surface of the chromium-containing steel sheet is usually removed. However, when the treatment time is long, economic efficiency deteriorates, and therefore the treatment time is preferably 600 seconds or less. The treatment time is more preferably 300 seconds or less.

The term "current density" as used herein refers to a value obtained by dividing the current flowing between the chromium-containing steel sheet, which is a material to be treated, and a counter electrode by the surface area of the material to be treated. In the case of current control, the current density is controlled.

Furthermore, although the treatment liquid used in the cathodic electrolysis treatment is not particularly limited, a sulfuric acid aqueous solution is preferable.

Furthermore, the concentration of the treatment liquid may be adjusted so that the conductivity of the treatment liquid is sufficiently high. For example, in the case of a sulfuric acid aqueous solution, the concentration of sulfuric acid is preferably set to be about 10 to 100 g/L.

When an inexpensive acid, such as a regenerated acid, is used, in some cases, other acids, such as hydrofluoric acid and phosphoric acid, may be contained as impurities. As long as the concentration of acids other than sulfuric acid is 5 g/L or less, this is permissible. Furthermore, needless to say, the concentration of acids other than sulfuric acid may be 0 g/L.

Moreover, the treatment temperature is not particularly limited but is preferably 30 to 85° C.

In the case where the same treatment liquid is used for oxide film removal and for etching treatment which will be described later, there is an advantage in terms of cost. Furthermore, depending on the structure of the electrolytic cell, oxide film removal and etching treatment can be continuously performed in the same electrolytic cell.

[Etching Treatment Step]

In an etching treatment step, the raw material chromium-containing steel sheet which has been subjected to the oxide film removal treatment to remove the oxide film on the surface is subjected to an etching treatment in an active region of the raw material chromium-containing steel sheet.

As the etching treatment for the chromium-containing steel sheet, etching treatments in three potential ranges, i.e., an active region, a passive region, and a transpassive region, can be considered. The reason for that etching treatment is performed in the active region in accordance with aspects of the present invention is as follows. That is, in the case where etching treatment is performed in the passive region, since a passive film is formed on the chromium-containing steel sheet, a sufficient etching effect cannot be obtained, and a desired effect of reducing interface resistance cannot be obtained. Furthermore, in the case where etching treatment is performed in the transpassive region, the dissolution amount of the chromium-containing steel sheet is large, and the dissolution rate also increases. In addition, depending on the potential, an oxygen evolution reaction may simultaneously occur in some cases and thus it becomes difficult to control the etching amount. On the other hand, in the case where etching treatment is performed in the active region, a sufficient etching effect can be obtained compared with in the passive region. Furthermore, when compared with in the transpassive region, a dissolution amount of the chromium-containing steel sheet is small, and a dissolution amount of the chromium-containing steel sheet can be easily controlled. In this way, in etching treatment in the active region, the dissolution amount of the chromium-containing steel sheet can be closely controlled, and thus the shape of a fine irregular structure formed on the surface of the steel sheet can be controlled in the nanometer order. Therefore, etching treatment in the active region has been selected here.

Furthermore, the dissolution amount in the etching treatment can be controlled by appropriately adjusting the temperature and concentration of the treatment liquid used in the etching treatment (for example, the sulfuric acid concentration when a sulfuric acid aqueous solution is used as the treatment liquid) and the treatment time.

Figure 3:
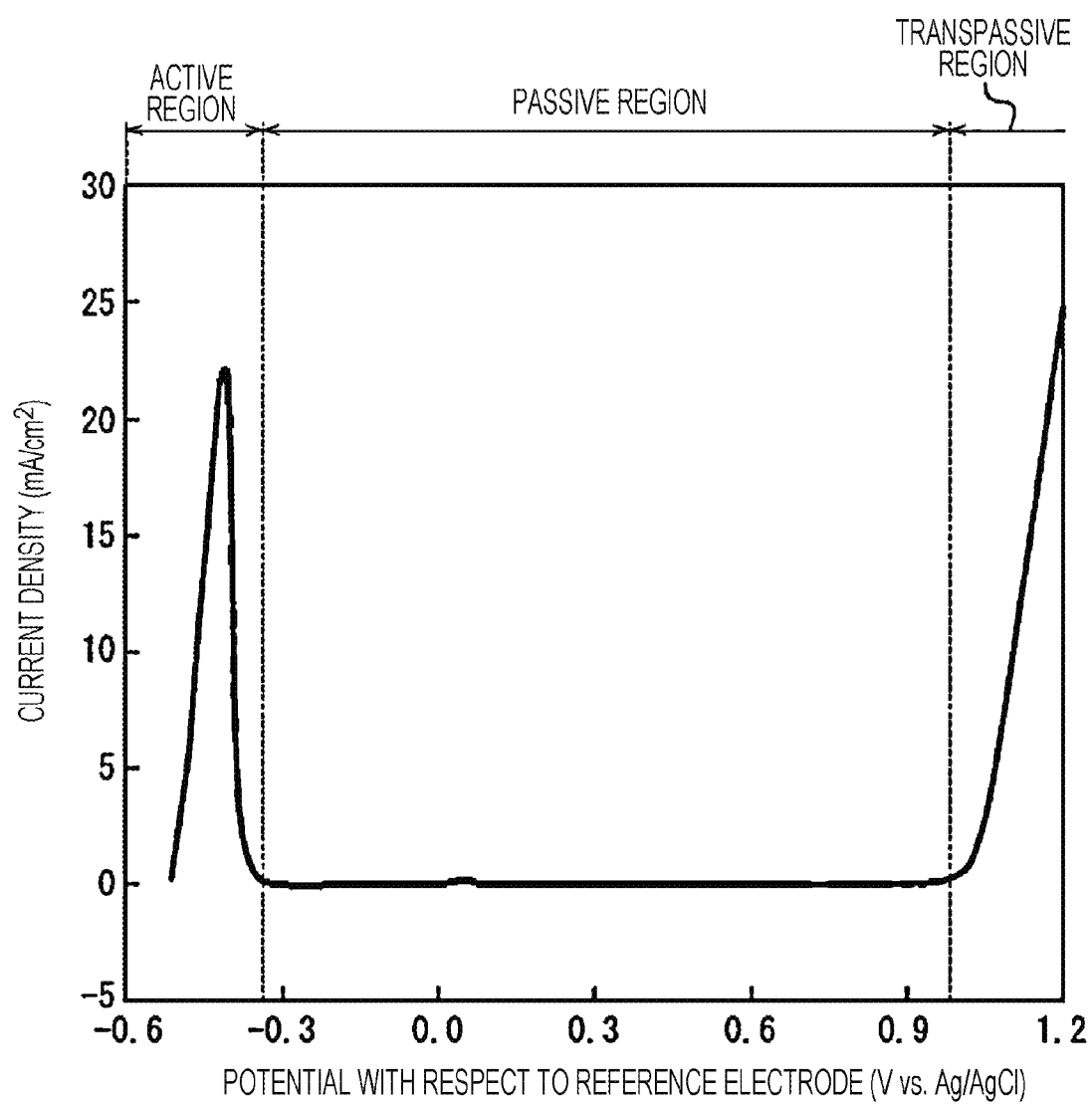
FIG. 3 is a graph showing an example of an anodic polarization curve.

The three potential ranges of the active region, the passive region, and the transpassive region can be defined as follows. That is, as shown in FIG. 3, for example, when a chromium-containing steel sheet having the chemical composition of Steel No. D in Table 1 which will be described later is polarized from the natural immersion potential toward the anode, the current and the current density increase from around the point where the potential exceeds −0.51 V (vs. Ag/AgCl) to reach the maximum value of about +22.0 mA/cm$^2$. Then, the current decreases with a rise in the potential, and when the potential reaches −0.34 V (vs. Ag/AgCl), the current density decreases to $1/100$ or less of the maximum value. This low current state continues in the potential range from −0.34 V (vs. Ag/AgCl) to +0.97 V (vs. Ag/AgCl), and then the current density suddenly increases with a rise in the potential. Note that FIG. 3 shows an anodic polarization curve obtained, regarding Steel No. D in Table 1 which will be described later, using a silver-silver chloride electrode as a reference electrode, in a 30 g/L sulfuric acid aqueous solution, under the conditions of 55° C. and a potential scanning rate of 1 mV/s. This potential scanning rate is used for obtaining the anodic polarization curve.

The potential range in which the current density increases with an initial rise in the potential is an active region. The potential range in which the current hardly flows, and the current density is maintained at a low value although the potential is raised is a passive region. The potential range in which the current density suddenly increases beyond the potential range of the passive region is a transpassive region.

Specifically, in an anodic polarization curve obtained when a chromium-containing steel sheet in a treatment liquid is polarized from the natural immersion potential toward the anode side at a scanning rate of 1 mV/s, the active region is defined as a potential range which appears first when the potential rises (before reaching the passive region which will be described later) and in which the current density increases with a rise in the potential, after the current density reaches the maximum value (the maximum value of the current density in the active region), the current density decreases to $1/100$ or less of the maximum value.

Furthermore, in the anodic polarization curve, the passive region is defined as a potential range in which the current hardly flows (specifically, a potential range in which the current density is maintained at $1/100$ or less of the maximum value) although the potential is raised beyond the active region.

Furthermore, the transpassive region is defined as a potential range which is beyond the passive region and in which the current suddenly increases with a rise in the potential.

Furthermore, since the active region changes depending on the steel type of the chromium-containing steel sheet, the treatment liquid used, and the like, it is preferable to obtain the anodic polarization curve that meets these conditions in advance and to assess the potential range of the active region before performing electrolytic etching treatment.

Specifically, in the case where etching treatment is performed under potential control, the anodic polarization curve for the chromium-containing steel sheet, which is a material to be treated, is obtained in advance, the potential range of the active region is assessed, and then etching treatment may be performed in that potential range.

For example, in the case where Steel No. D in Table 1 which will be described later is treated with a 30 g/L sulfuric acid aqueous solution, since the potential range of −0.51 V to −0.34 V (vs. Ag/AgCl) is a potential range corresponding to the active region, etching treatment may be performed in the potential range of the active region, by appropriately adjusting the treatment time in the range of 1 to 600 seconds.

Furthermore, in the case where etching treatment is performed under current control, the relationship between the current density and the electrolysis potential is checked in advance, and the range of the current density in which electrolysis in the active region occurs is assessed, and then etching treatment may be performed in the range of the current density.

However, in the case of current control, since the appropriate current density changes depending on the steel type of the chromium-containing steel sheet used, the treatment liquid, and the like, adjustment is required each time.

Furthermore, it is difficult to use a reference electrode in plant facilities where a large electrolysis device is used, such as the case where the material to be treated is large or a coiled steel sheet is subjected to etching treatment. In such a case, by confirming the relationship between the current density and the electrolysis voltage applied between the chromium-containing steel sheet, which is a material to be treated, and the counter electrode while increasing the current density, the current density at which etching in the active region occurs is confirmed, and then etching treatment may be performed at that current density.

Furthermore, for example, if the current density is in the range until the electrolysis voltage applied between the chromium-containing steel sheet which is the material to be treated and the counter electrode suddenly increases, the current density can be judged to be in the active region. If the current density is in the range after the electrolysis voltage applied between the chromium-containing steel sheet which is the material to be treated and the counter electrode suddenly increases, the current density can be judged to be in the transpassive region.

For example, in the case where Steel No. D in Table 1 which will be described later is treated with a 30 g/L sulfuric acid aqueous solution, by controlling the current density to about 0.01 to 10.00 mA/cm$^2$, electrolysis can be performed in the potential range corresponding to the active region. Therefore, electrolytic etching treatment may be performed by adjusting the treatment time in the range of 1 to 600 seconds in the current density range corresponding to the active region.

The term "current density" as used herein refers to a value obtained by dividing the current flowing between the chromium-containing steel sheet, which is a material to be treated, and a counter electrode by the surface area of the material to be treated. In the case of current control, the current density is controlled.

In addition, the treatment liquid used in the electrolytic etching treatment is preferably a sulfuric acid aqueous solution.

Furthermore, the concentration of the treatment liquid may be adjusted so that the conductivity of the treatment liquid is sufficiently high. For example, in the case of a sulfuric acid aqueous solution, the concentration of sulfuric acid is preferably set to be about 10 to 300 g/L. Furthermore, for the purpose of removing smuts generated on the surface of the chromium-containing steel sheet, a small amount of nitric acid may be added to the treatment liquid. However, nitric acid passivates the chromium-containing steel sheet to thereby suppress the etching effect. Therefore, the concentration of nitric acid is preferably 10 g/L or less. Furthermore, in the case of a sulfuric acid aqueous solution, the concentration of nitric acid is preferably less than or equal to the concentration of sulfuric acid. Furthermore, needless to say, the concentration of nitric acid may be 0 g/L.

Furthermore, acids other than sulfuric acid and nitric acid described above are preferably minimized. However, when an inexpensive acid, such as a regenerated acid, is used, in some cases, other acids, such as hydrofluoric acid and phosphoric acid, may be contained as impurities. As long as the concentration of acids other than sulfuric acid and nitric acid is 5 g/L or less, this is permissible. Furthermore, needless to say, the concentration of acids other than sulfuric acid may be 0 g/L.

Moreover, the treatment temperature is not particularly limited but is preferably 30 to 85° C. Furthermore, in the case where oxide film removal treatment and electrolytic etching treatment can be performed using the same treatment liquid and at the same treatment temperature, continuous treatment is possible using the same electrolytic cell.

Note that the etching treatment can be performed simply by the immersion in the treatment liquid without electrolysis. As described above, when the etching treatment is performed under potential control or current control, stable treatment with little unevenness can be expected. However, even in the case where, after oxide film removal treatment is performed by cathodic electrolysis treatment, the raw material steel sheet is allowed to remain immersed in the treatment liquid without electrolysis, since the potential of the raw material chromium-containing steel sheet from which the oxide film has been removed rises to the active region, etching treatment can be performed in the active region.

[Immersion Treatment in Oxidizing Solution, or Electrolysis Treatment in Oxidizing Solution in Passive Region of Raw Material Chromium-Containing Steel Sheet]

In order to improve cycle characteristics of nonaqueous electrolyte secondary batteries, it is important to dissolve (remove) deposits, such as smuts, formed during the etching treatment by subjecting the raw material chromium-containing steel sheet which has been subjected to the etching treatment to an immersion treatment in an oxidizing solution, or to an electrolysis treatment in the passive region of the raw material chromium-containing steel sheet (hereinafter, may be also referred to as "immersion treatment in an oxidizing solution" or "electrolysis treatment").

That is, after the etching treatment, large amounts of smuts (mixtures including C, N, S, O, Fe, and Cr as main constituent elements) are generated on the surface of the chromium-containing steel sheet, and if these remain, this will cause an increase in interface resistance. In this respect, after the etching treatment, by performing the immersion treatment in an oxidizing solution or the electrolysis treatment, the smuts are removed, the effect of reducing interface resistance can be obtained, and cycle characteristics of nonaqueous electrolyte secondary batteries are improved.

Here, examples of the oxidizing solution include a nitric acid aqueous solution and a hydrogen peroxide aqueous solution.

As the immersion time increases, removal of smuts and the like is more enhanced. However, when the immersion time is too long, the effect is saturated and the productivity is decreased. Therefore, the treatment time in the immersion treatment is preferably 90 minutes or less, and more preferably 15 minutes or less. The lower limit thereof is preferably 0.5 minutes or more, and more preferably 1 minute or more.

Furthermore, in the case where a nitric acid aqueous solution is used, the concentration of nitric acid is preferably 10 to 400 g/L. Furthermore, in the case where a hydrogen peroxide aqueous solution is used, the concentration of hydrogen peroxide is preferably 10 to 300 g/L. Note that acids contained as impurities in each treatment liquid are permissible as long as the concentration thereof is 10 g/L or less. The lower limit of acids contained as impurities in each treatment liquid is not particularly limited and may be 0 g/L.

In addition, the treatment temperature in the immersion treatment in an oxidizing solution is not particularly limited but is preferably 30 to 60° C.

Furthermore, in the electrolysis treatment, the potential may be adjusted to the potential region in which the chromium-containing steel sheet is passivated. In particular, the potential region in which constituents other than Cr, such as Fe and Ni, contained in steel are dissolved and Cr is not dissolved is preferable.

Since the potential region (passive region) in which the chromium-containing steel sheet is passivated differs depending on the treatment liquid (electrolyte) used and the steel type of the chromium-containing steel sheet, it is preferable to adjust the potential region for each treatment liquid and each steel type of the chromium-containing steel sheet. For example, when Steel No. D in Table 1 which will be described later is treated using a 50 g/L nitric acid aqueous solution, it is preferable to perform electrolysis treatment in the potential range of +0.40 to +0.60 V (vs. Ag/AgCl). Furthermore, as the treatment time increases, removal of smuts on the surface of the steel sheet is more enhanced. However, when the treatment time is too long, the effect is saturated and the productivity is decreased. Therefore, the electrolysis time is preferably 90 minutes or less. More preferably, the electrolysis time is 15 minutes or less. The lower limit thereof is preferably 0.5 minutes or more, and more preferably 1 minute or more.

Furthermore, the treatment temperature in the electrolysis treatment is not particularly limited but is preferably 30 to 70° C.

In the immersion treatment in an oxidizing solution or the electrolysis treatment in the passive region of the raw material chromium-containing steel sheet, the surface of the chromium-containing steel sheet, which is a material to be treated, may be rubbed with a nonwoven fabric wiper or the like as necessary. Thereby, smuts and the like are easily removed, and thus it becomes possible to obtain the effect of further reducing the interface resistance.

EXAMPLES

Chromium-containing steel sheets (raw material chromium-containing steel sheet) having the chemical compositions shown in Table 1 (with the balance being Fe and incidental impurities) and a thickness of 10 μm were prepared, and under the conditions shown in Table 2, oxide film removal treatment, etching treatment, and immersion treatment in an oxidizing solution or electrolysis treatment were performed (Sample No. 1 and Nos. 4 to 7). In Sample No. 2, none of the treatments described above was performed, and in Sample No. 3, immersion treatment in an oxidizing solution only was performed ("-" under the manufacturing conditions in Table 2 indicates that the treatment was not performed).

The current density in Table 2 is a value obtained by dividing the current flowing between the chromium-containing steel sheet, which is a material to be treated, and a counter electrode by the surface area of the material to be treated. Furthermore, before performing the etching treatment, for each condition and steel type, the relationship between the current density and the electrolysis voltage applied between the chromium-containing steel sheet, which is a material to be treated, and the counter electrode was checked. It was confirmed that, in the case of current control, the active region was reached under any conditions by adjusting the current density to +0.8 mA/cm$^2$.

Furthermore, in Sample No. 7 in Table 2, as treatment after the etching treatment, electrolysis treatment was performed under the following conditions. That is, using a 50 g/L nitric acid aqueous solution, electrolysis treatment was performed under the conditions of a treatment temperature of 55° C., a potential of +0.50 V (vs. Ag/AgCl), and a treatment time of 60 seconds. In the chromium-containing steel sheet of Steel No. D, the potential of +0.50 V (vs. Ag/AgCl) corresponded to the passive region.

Regarding the chromium-containing steel sheets produced as described above, the average height of protrusions and the average spacing between protrusions were measured by the methods described above. The results thereof are shown in Table 2. Furthermore, using the chromium-containing steel sheets, corrosion resistance and cycle characteristics were evaluated by the following procedures.

[Evaluation of Corrosion Resistance]

Using, as a working electrode, the chromium-containing steel sheet prepared as described above and using Li metal foils for a counter electrode and a reference electrode, in an electrolyte (1M $LiPF_6$, ethylene carbonate:diethyl carbonate=1:1 (volume ratio)), by observing the current density of the chromium-containing steel sheet during potential scanning in the potential range described below, corrosion resistance in the battery environment was evaluated.

In the evaluation, the potential was raised from the initial immersion potential (immersion potential at the start of the test) to 5.0 V, then the potential was lowered to 0.0 V, and then the potential was raised to the initial immersion potential. The evaluation was performed until the potential reached the initial immersion potential.

In this evaluation, if the current density is low, corrosion products and the like are not formed on the surface of the chromium-containing steel sheet, and corrosion pits are also not formed. Therefore, it is possible to judge that corrosion resistance in the battery environment can be secured. The measurement was carried out at 25° C. in an argon atmosphere with a dew-point temperature of −70° C. or lower.

Potential Scanning Method

Potential scanning range: initial immersion potential (immersion potential at the start of the test)→5.0 V→0.0 V→initial immersion potential The potential is the potential V (vs. Li/Li$^+$) with respect to the Li metal foil of the counter electrode.

Scanning rate: 5 mV/s

The evaluation criteria for corrosion resistance are as follows. The evaluation results are shown in Table 2.

○ (pass): The absolute value of the maximum current density is 100 µA/cm$^2$ or less.

x (rejection): The absolute value of the maximum current density is more than 100 µA/cm$^2$.

[Evaluation of Cycle Characteristics]

A coin-shaped cell of a nonaqueous electrolyte lithium ion secondary battery having the following battery configuration was produced, and cycle characteristics were evaluated under the following conditions.

(Battery Configuration)

Coin-shaped cell (positive electrode area: 15 mmφ, negative electrode area: 16 mmφ):

Positive electrode active material: $LiNi_{0.6}Mn_{0.2}Co_{0.2}O_2$ (Ni:Mn:Co=6:2:2 (atomic ratio))

Positive electrode conductive assistant: acetylene black

Positive electrode binder: polyvinylidene fluoride

Positive electrode current collector: Al foil

Negative electrode: natural graphite

Negative electrode thickener: carboxymethyl cellulose

Negative electrode binder: styrene butadiene rubber

Negative electrode current collector: each of the chromium-containing steel sheets produced as described above Electrolyte: 1M $LiPF_6$, ethylene carbonate:ethyl methyl carbonate:dimethyl carbonate=1:1:1 (volume ratio), vinylene carbonate (1 wt %)

Separator: polypropylene separator (Test Conditions)

Charging: 1C constant current constant voltage; After reaching 4.2 V, charging ends when the current value reaches 0.1C.

Pause: 10 minutes

Discharging: 1C constant current; After reaching 2.5 V, discharging ends.

Temperature: 25° C.

1 cycle: charging→pause→discharging→pause

Number of cycles: 300 cycles

The evaluation criteria for cycle characteristics are as follows. The evaluation results are shown in Table 2.

○ (pass): The discharge capacity retention at the 300th cycle is 90% or more.

x (rejection): The discharge capacity retention at 300th cycle is less than 90%.

The discharge capacity retention at 300th cycle (%) was calculated by 100×(discharge capacity in the 300th cycle/discharge capacity in the first cycle).

TABLE 1

| | Chemical composition (mass %) | | | | | | | | | |
|---|---|---|---|---|---|---|---|---|---|---|
| Steel No. | C | Si | Mn | P | S | Cr | Ni | Al | N | Other constituents |
| A | 0.006 | 0.26 | 0.42 | 0.027 | 0.001 | 10.95 | 0.14 | 0.045 | 0.006 | Ti:0.24, V:0.05 |
| B | 0.034 | 0.24 | 0.51 | 0.026 | 0.005 | 16.17 | 0.15 | 0.002 | 0.041 | — |
| C | 0.005 | 0.31 | 0.16 | 0.026 | 0.001 | 19.19 | 0.26 | 0.008 | 0.007 | Mo:1.83, Nb:0.35 |
| D | 0.009 | 0.15 | 0.17 | 0.027 | 0.002 | 20.70 | 0.15 | 0.032 | 0.009 | Ti:0.29, Cu:0.43 |

TABLE 2

| Sample No. | Steel No. | Oxide film removal treatment | | | | Etching treatment | | | | | Immersion treatment or Electrolysis treatment | | | |
|---|---|---|---|---|---|---|---|---|---|---|---|---|---|---|
| | | Treatment liquid | Treatment temperature (° C.) | Current density (mA/cm²) | Treatment time (sec) | Treatment liquid | Treatment temperature (° C.) | Current density (mA/cm²) | Treatment time (sec) | Etching potential | Treatment liquid | Treatment method | Treatment temperature (° C.) | Treatment time (sec) |
| 1 | A | 30 g/L sulfuric acid aqueous solution | 55 | −0.8 | 60 | 30 g/L sulfuric acid aqueous solution | 55 | +0.8 | 60 | Active region | 300 g/L nitric acid aqueous solution | Immersion treatment | 55 | 30 |
| 2 | B | — | — | — | — | — | — | — | — | — | — | — | — | — |
| 3 | B | — | — | — | — | — | — | — | — | — | 300 g/L nitric acid aqueous solution | Immersion treatment | 55 | 60 |
| 4 | | 30 g/L sulfuric acid aqueous solution | 55 | −0.8 | 30 | 30 g/L sulfuric acid aqueous solution | 55 | +0.8 | 30 | Active region | 300 g/L nitric acid aqueous solution | Immersion treatment | 55 | 60 |
| 5 | | 30 g/L sulfuric acid aqueous solution | 55 | −0.8 | 30 | 30 g/L sulfuric acid aqueous solution | 55 | —*2 | 30 | Active region | 300 g/L nitric acid aqueous solution | Immersion treatment | 55 | 60 |
| 6 | C | 30 g/L sulfuric acid aqueous solution | 55 | −0.8 | 60 | 30 g/L sulfuric acid aqueous solution | 55 | +0.8 | 60 | Active region | 300 g/L nitric acid aqueous solution | Immersion treatment | 55 | 60 |
| 7 | D | 30 g/L sulfuric acid aqueous solution | 55 | −0.8 | 60 | 30 g/L sulfuric acid aqueous solution | 55 | +0.8 | 60 | Active region | 50 g/L nitric acid aqueous solution | Electrolysis treatment (passive region) | 55 | 60 |

| Sample No. | Average height of protrusions (nm) | Average spacing between protrusions (nm) | Corrosion resistance | Discharge capacity retention (%) | Evaluation | Remarks |
|---|---|---|---|---|---|---|
| 1 | 62 | 250 | ○ | 93 | ○ | Example |
| 2 | <10*1 | —*1 | ○ | 80 | x | Comparative Example |
| 3 | ≤10*1 | —*1 | — | 83 | x | Comparative Example |

TABLE 2-continued

| | | | | | |
|---|---|---|---|---|---|
| 4 | 30 | 146 | ○ | 92 | ○ Example |
| 5 | 31 | 134 | ○ | 90 | ○ Example |
| 6 | 32 | 163 | ○ | 92 | ○ Example |
| 7 | 27 | 122 | ○ | 91 | ○ Example |

Note:
Underlined items are outside the range of the present invention.
*1There are no protrusions with a height of 10 nm or more that are regarded as protrusions in the present invention.
*2After oxide film removal treatment, immersed without current control.

From Table 2, the following matters are clear.
(a) In all of Examples, desired cycle characteristics were obtained.
(b) On the other hand, in Sample Nos. 2 and 3 which are Comparative Examples, desired cycle characteristics were not obtained.

The invention claimed is:

1. A chromium-containing steel sheet for a current collector of a nonaqueous electrolyte secondary battery, the chromium-containing steel sheet comprising a chemical composition containing 10% by mass or more of Cr, wherein:
    the chromium-containing steel sheet has an irregular structure including recesses and protrusions at a surface thereof; and
    an average height of the protrusions is 20 nm or more and 100 nm or less, and an average spacing between the protrusions is 20 nm or more and 300 nm or less.

2. A method for manufacturing the chromium-containing steel sheet for a current collector of a nonaqueous electrolyte secondary battery according to claim 1 comprising:
    preparing a raw material chromium-containing steel sheet;
    then, removing an oxide film on a surface of the raw material chromium-containing steel sheet;
    then, subjecting the raw material chromium-containing steel sheet from which the oxide film has been removed to an etching treatment in an active region of the raw material chromium-containing steel sheet; and
    then, subjecting the raw material chromium-containing steel sheet which has been subjected to the etching treatment to an immersion treatment in an oxidizing solution, or to an electrolysis treatment in an passive region of the raw material chromium-containing steel sheet.

* * * * *